C. H. NASH.
TRAP.
APPLICATION FILED APR. 30, 1918.

1,297,893.

Patented Mar. 18, 1919.

Inventor
C. H. Nash,

By
E. Hume Talbert
Attorney

UNITED STATES PATENT OFFICE.

CHARLES H. NASH, OF RAVENNA, OHIO.

TRAP.

1,297,893.　　　　Specification of Letters Patent.　　Patented Mar. 18, 1919.

Application filed April 30, 1918.　Serial No. 231,640.

*To all whom it may concern:*

Be it known that I, CHARLES H. NASH, a citizen of the United States, residing at Ravenna, in the county of Portage and State of Ohio, have invented new and useful Improvements in Traps, of which the following is a specification.

The invention relates to an improved animal trap in which the victim is captured without being killed or wounded.

The principal object is to provide a device of this character which may be regulated to capture a certain sized animal, there being provision made for setting the trap, so that it may be operated only by the size animal which it is desired to entrap.

A second and further object is to provide a device of this nature which may be easily and cheaply built and yet be effective and durable in operation.

Other and further objects will appear as the device is set forth in detail in the description which follows.

As illustrated in the drawings the invention is shown in but one of its embodiments to which, however, it is not to be restricted. The actual reduction to practice may demand certain desirable changes or alterations and these the right is claimed to make, provided they do not deviate from the scope of the appended claim.

Figure 1:
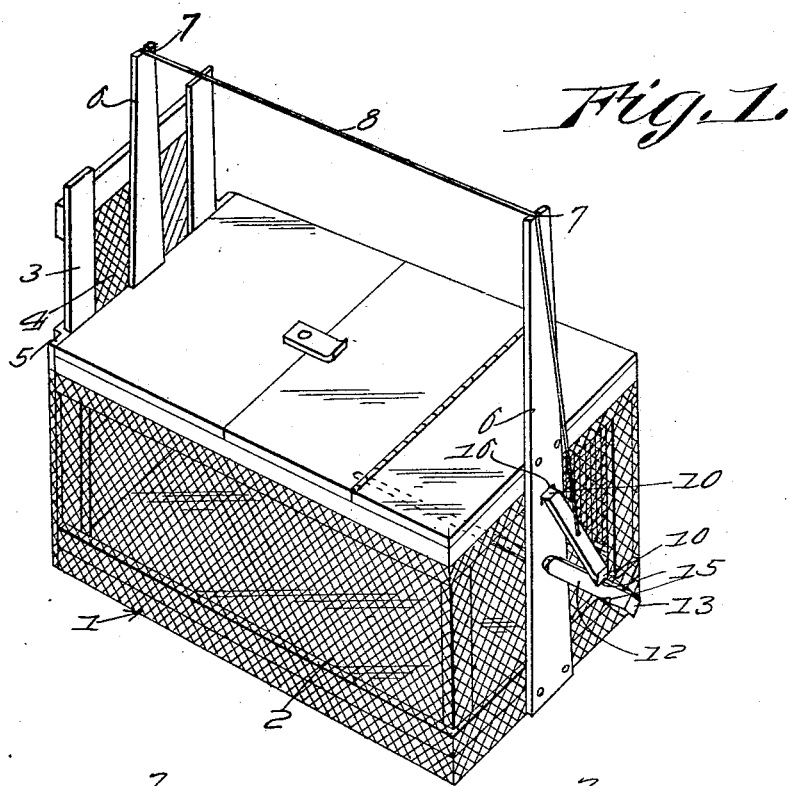
Figure 1 is a perspective view of the invention, showing it in set position.
Figure 2:
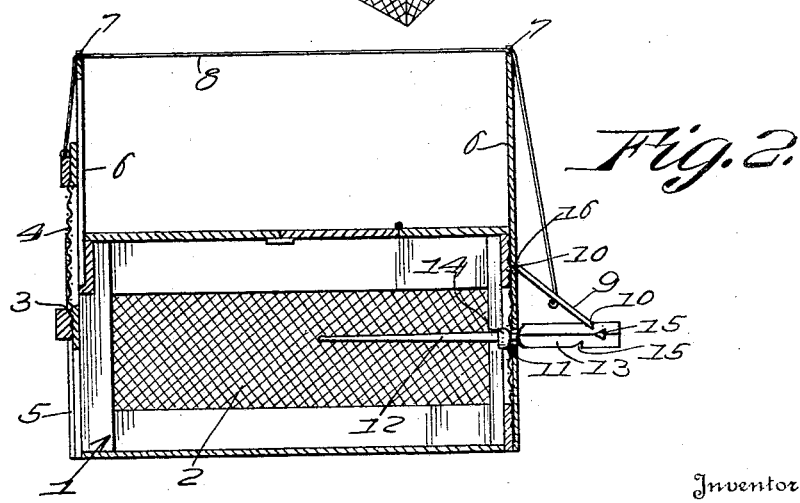
Fig. 2 is a longitudinal sectional view.

In the drawings there is shown a cage made up of the frame work 1 on which a suitable wire screen 2 is attached by any acceptable means. The cage has the shape of a parallelepiped it being open at one end and provided with a door 3 slidably mounted for closing this open end. The door 3 carries a wire mesh 4 which is attached to it in the same manner that the wire 2 is attached to the frame 1. The slides for the door comprise members 5 which are L-shaped in cross section and which are attached on the cage in such a manner that they overlap the longitudinal edges of the door, thereby permitting the sliding movement of the latter.

At either end of the cage and rising upwardly from the top thereof, there are two upright members 6 having V-shaped depressions 7 formed in their upper ends. A cable 8 is secured in any acceptable manner to the top of the door 3 at its center and this cable is designed to be passed over the tops of the uprights 6, lying in the depressions 7 formed therein and in which is permitted an easy sliding movement because of the corners of the depressions being rounded.

At the end remote from that connected to the door, the cable 8 has attached to it in any acceptable manner the bar 9. This bar 9 has its ends 10 beveled to make them relatively thin on the edge.

The upright 6 at the rear of the cage extends clear to the bottom thereof and at a specified point in this upright a circular opening 11 is prepared, this opening having its edges rounded, so that the surrounding wall of the opening will present a semicircular outline in cross section.

A tripping lever 12 loosely engages in the opening at the point adjacent to the shoulder portion 13, the shoulder portion being square in cross section and the remaining portion of the tripping lever being circular in cross section, tapering toward its free end. A collar 14 is suitably attached on the circular portion of the tripping lever on one side of the opening 11, the shoulder portion of the lever abutting on the other side of the opening 11. Both the collar 14 and the shoulder portion 13 are rounded on the ends which face the opening 11, thus providing for angular movement of the tripping lever in any direction. The shoulder portion 13 of the lever is provided with notches 15 cut in each of its four corners and so disposed with reference to each other that a line connecting them forms a spiral. A notch 16 is formed in the outer face of the rear upright 6 which notch coöperates with one of the ends 10 of the bar 9 in holding the bar 9 when the trap is in a set position.

From the foregoing description taken in connection with the accompanying drawings, the operation of the device is obvious. The door 3 is first raised and the cable 8 placed in the notch 7 on top of the uprights 6. The bar 9 is then made to engage the notch 16 and one of the notches 15 and, since the cable 8 is connected to this bar, the door is maintained in its open position as its tendency to descent is met by a tendency of the shoulder portion 13 to raise. This results in keeping the beveled ends 10 of the bar 9 in engagement with the notches 15 and 16. The bait used is placed on the extreme end of the circular portion of the trip lever and the removal of this bait by any animal which enters the trap results in raising this end of the lever or moving it to one side or the other thereby releasing the bar 9 and permitting the door to drop by gravity, thus incaging the animal. Since the notches 15 are spirally disposed around the shoulder portion 13, it is evident that the end of the tripping lever within the cage can be raised to various heights when setting the trap by making one end of the bar 9 engage different notches of the notches 15, the engagement of the bar with the notch 15 nearest the opening 11 raising the inner end of the tripping lever to its greatest height within the trap while the engagement of this bar with the next adjacent notch 15 will duly lower the interior end of the tripping lever. As the bar 9 is made to engage a notch 15 which is farther away from the opening 11 than the previous notch, the inner end of the tripping lever is correspondingly lowered and the bar 9 made to assume a less acute angle with the rear end of the cage, thus lowering the door a slight distance. This arrangement is of advantage in that it permits the trap to be set to catch a certain size animal. When that end of the bar which carries the bait is at its lowest point the door 2 is also at its lowest point, thus closing the opening in the cage enough to permit only a small animal such as a mouse to enter. The baited end of the trip lever is then low enough for this mouse to take the bait and thus operate the trap. The small opening left by the partial closing of the door is sufficient to preclude the entering of any animal of greater size than that which it is desired to trap.

When the trip lever is set at its highest point, as it is when the bar 9 is made to engage the notch 15 which is nearest the opening 11, the door is also at its highest point thereby providing for the greatest opening at the end of the trap. This opening is presumed to be sufficient to admit the largest animal of which the trap is capable of incaging. The end of the trip lever which carries the bait is then raised to its highest point placing the bait in the reach only of the tallest animal which can pass through the opening. Therefore, the bait is not within the reach of any small animal which it is not desired to catch, and therefore, such a small animal, if it were to enter the trap, would be unable to operate the same. On the other hand when the trap is set to incage a small animal the lowering of the door 2 precludes the entrance thereinto of any larger animal but the bait end of the tripping lever is sufficiently lowered with the lowering of the door to permit such a small animal to take the bait and operate the trap.

The invention having been described what is claimed as new and useful is:

A trap comprising a cage having an opening at one end, a slidably mounted door for said opening, a trip lever carried in that end of the cage remote from the opening, the said trip lever being partly interior and partly exterior to the cage and being mounted both for swinging and rotating movement, the exterior portion of the trip lever being provided with a plurality of notches arranged in the form of a spiral therearound, uprights mounted on the cage adjacent the door and the trip lever respectively, a cable having one end attached to the door and passing slidably over the upper ends of the uprights, and a bar to which the remaining end of the cable is connected, the upright adjacent the trip lever having a notch formed therein, the bar having one end engaging in the last said notch and the other end in any one of the notches formed on the trip lever, whereby the extent to which the door may be made to uncover the opening may be varied by rotating the trip lever to bring a particular notch thereon into position for engagement with the bar, the swinging movement of which the trip lever is capable permitting the bar to be disengaged and the door thereafter to be lowered by gravity.

In testimony whereof I affix my signature.

CHARLES H. NASH.